May 15, 1945.　　F. C. FREEMAN ET AL　　2,376,043
MINERAL WOOL APPARATUS
Filed Nov. 25, 1942
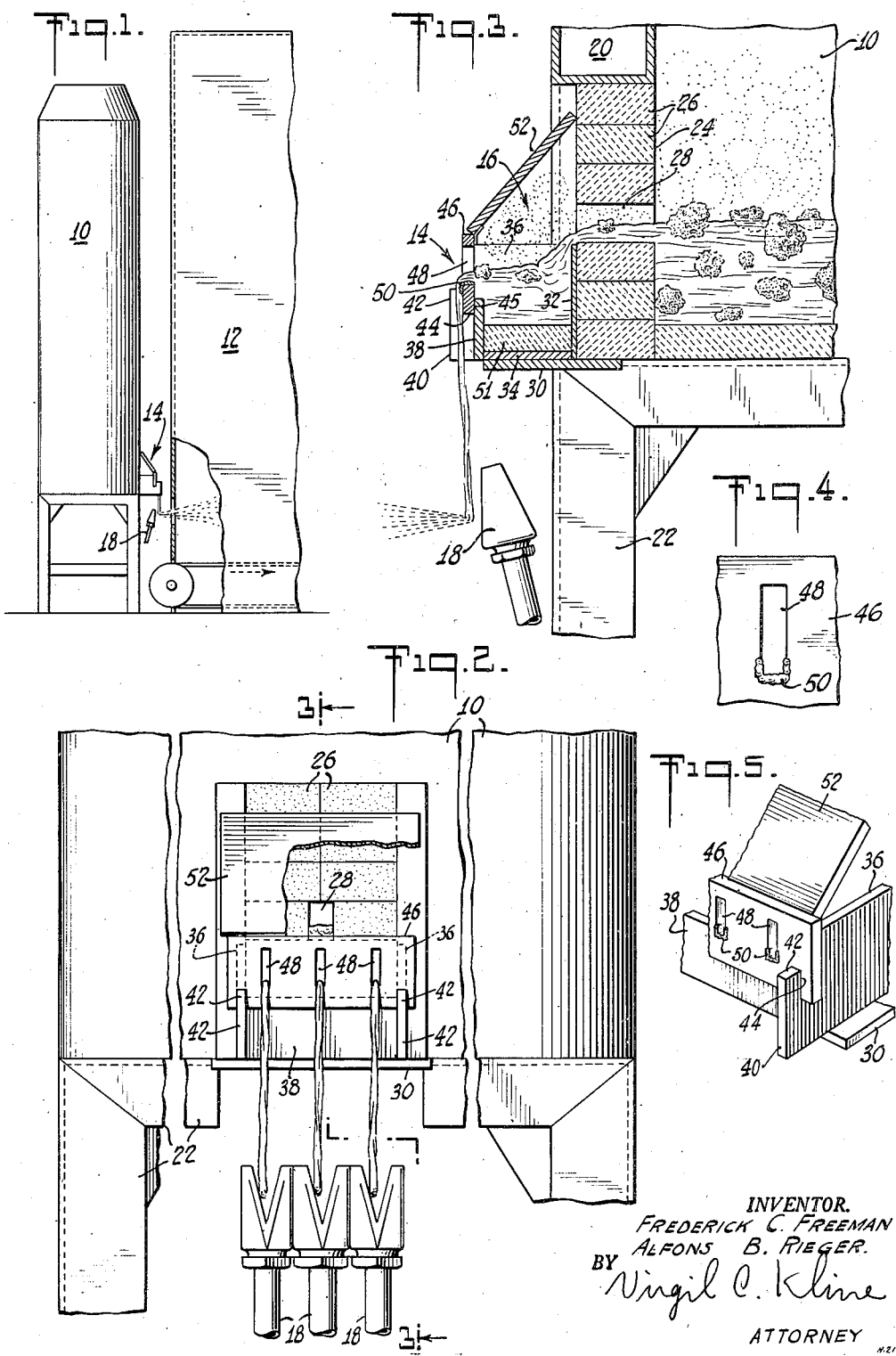
INVENTOR.
FREDERICK C. FREEMAN
ALFONS B. RIEGER.
BY Virgil C. Kline
ATTORNEY Patented May 15, 1945

2,376,043

UNITED STATES PATENT OFFICE 2,376,043

MINERAL WOOL APPARATUS

Frederick C. Freeman, Lake Forest, and Alfons B. Rieger, Waukegan, Ill., assignors to Johns-Manville Corporation, New York, N. Y., a corporation of New York Application November 25, 1942, Serial No. 466,968

5 Claims. (Cl. 49—55)

The instant invention relates to an apparatus for the manufacture of mineral wool and, more particularly, to improved means for the subdivision of molten raw material into streams of suitable size and character to be converted into fibres.

Conventionally in the manufacture of mineral wool, raw material, such as slag, rock, or the like, or mixtures thereof are reduced to molten condition in a suitable furnace such as a cupola, tank furnace, or the like. The molten material flows either directly from the furnace, in front of a steam blast by which it is converted into a multiplicity of fine fibres, or the molten material flows onto a stream splitter customarily comprising a V trough, the material falling in streams from each end of the trough in front of suitably located steam blasts for conversion into fibres.

The invention has for its principal object the provision of a stream splitter, or dividing means of improved type and, more particularly, the invention is directed to the provision of such dividing means in the form of a receptacle having a multiplicity of fluid discharge orifices in a wall thereof. The apparatus, in accordance with a further object of the invention, is constructed and arranged to prevent or retard the flow of fuel, such as coke, into the streams subjected to the fiberizing blast.

A further object of the invention is the provision of an apparatus, as referred to above, including special features of construction promoting ease and efficiency of operation.

My invention will be more fully understood and further objects and advantages thereof will become apparent when reference is made to the more detailed description thereof which is to follow and to the accompanying drawing, in which:

Fig. 1 is a side elevational view illustrating the general arrangement of the melting furnace, dividing means, and fiberizing means in an apparatus embodying the instant invention;

Fig. 2 is a front elevational view on an enlarged scale of a melting furnace and dividing means embodying the invention;

Fig. 3 is a sectional view taken on the line 3—3 of Fig. 2;

Fig. 4 is a detail view on an enlarged scale illustrating a discharge orifice; and Fig. 5 is a detail view illustrating the construction of the dividing means.

Referring now to the drawing and, more particularly, to Fig. 1, there is shown a mineral wool-forming apparatus comprising a melting furnace 10, such as a cupola. Adjacent the melting furnace is a blow chamber 12, or other conventional fibre-receiving device. The melting furnace includes a discharge opening 14 from which the molten material flows into a dividing means 16 embodying the instant invention. Below the dividing means is a plurality of jet nozzles 18 from which high velocity jets of steam, compressed air, or the like, are blown against the streams of molten material issuing from the dividing means. The steam jets subdivide the streams of molten material into a great multiplicity of fine fibres which are gathered in the blow chamber 12, or other collecting means. As will be understood, the furnace 10 and collecting means 12 are shown as a cupola and blow chamber, respectively, merely for purposes of illustration, and any other equivalent devices may be employed for the same purposes.

Referring now, particularly, to Figs. 2 and 3, melting furnace 10, supported on a suitable foundation 22, includes a jacketed wall 20. In the front wall of the cupola an opening is provided, as indicated at 24, which is bricked up with refractory material, such as fire-brick 26, to leave a restricted discharge opening 28 which, however, is of sufficient size to permit a relatively large stream of molten material to pass therethrough. Subdividing means 16 is supported in front of the melting furnace and adjacent discharge opening 28 by any suitable means such as plate 30 carried by foundation 22.

The subdividing means comprises a back wall 32, bottom wall 34, end walls 36, and a partial front wall member 38. These members are secured together in assembled relationship in any suitable manner; for example by welding, and are formed of a suitable, relatively heat-resistant metal plate. End walls 36 include extensions 40 having upwardly projecting flanges 42 defining notches 44 with the edges 45 of the end walls. As will be observed, particularly from an examination of Fig. 3 the forward edges 45 of end walls 36 are in alignment or substantial alignment with the outer face of wall member 38. Removably received within notches or slots 44 is a front wall member or plate 46. Plate 46 has a plurality of relatively elongated molten-material discharge orifices 48 whose bottom edges are elevated substantially from the bottom of the dividing means. The particular dimensions of the orifices 48 may depend upon various operating conditions; for example, the particular melt employed, and the like, but the orifices are preferably so arranged that the molten material, when flowing therefrom in a stream of desired size for efficient fiberization, will fill the greater length of the orifices. Orifices 48 include lips 50 reinforced by heat-resistant material, such as stainless steel welding material, which is welded to the plate 46 at these locations. Preferably a layer 51 of refractory material, such as fire-brick, is placed to overlie bottom plate 34.

Where found desirable, a cover 52 may be employed for the dividing means. Suitably this comprises merely a metal plate resting upon the upper edge of plate 46 and leaning against the cupola wall as illustrated in Fig. 3. If desired, any suitable means may be provided for hingedly securing plate 52 to the cupola wall. However, as will be understood, preferably the cover should not be affixed to plate 46, as the latter should be removable at will.

In the operation of the mineral wool-forming apparatus embodying the features of the present invention, the raw material mixed with fuel, such as coke, is reduced to molten form in the cupola in the usual manner. A pool of the molten material is formed in the bottom of the cupola, as illustrated diagrammatically in Fig. 3, the pool as usual containing a certain number of floating pieces of coke, or other fuel. Due to the relatively restricted opening 28 provided in wall 26, the larger pieces cannot pass into the dividing means. The smaller pieces, which do pass through opening 28, tend to float on the surface of the pool formed in the dividing means and, if not consumed, may be easily scraped off to avoid interference with the streams issuing from the orifices 48. In the event that pieces of fuel or other foreign material approach the orifices, due to the fact that the orifices are substantially filled with the molten material, such pieces cannot readily enter the molten material streams issuing from the dividing means. The relatively deep pool of the molten material in the dividing means and the subjection of the pool to the flame issuing from opening 28 maintain the material in its highly fluent condition for proper fiberization.

Plate 46, containing the discharge orifices 48, may readily be replaced, as may be necessitated from time to time, by merely lifting it out with a pair of tongs, or the like, and substituting another in its place. As previously pointed out, the orifices will be dimensioned to provide streams of the proper size for the most efficient fiberization, depending upon the particular raw materials and operating conditions. In the event that such materials and conditions are to be altered, a plate having the proper sized orifices for efficient operation under the changed conditions, may be substituted.

Having thus described my invention in rather full detail, it will be understood that these details need not be strictly adhered to, but that various changes and modifications will suggest themselves to one skilled in the art, all falling within the scope of the invention as defined by the subjoined claims.

What we claim is:

1. In a mineral wool-forming apparatus, a receptacle for receiving the molten material, said receptacle comprising bottom, rear, and end walls, and a partial forward wall secured in assembled relationship, said end walls including extensions projecting beyond said partial forward wall and defining member-receiving slots and a forward wall member having a plurality of discharge orifices removably supported in said slots.

2. In a mineral wool-forming apparatus, a receptacle for receiving the molten material, said receptacle comprising bottom, rear, and end walls, and a partial forward wall secured in assembled relationship, said end walls including extensions projecting beyond said partial forward wall and defining member-receiving slots, and a forward wall member removably supported in said slots, said member having a plurality of elongated discharge orifices having their lower edges elevated for a substantial distance from the bottom of the receptacle and including lips formed of a heat-resistant material welded to the member.

3. In a mineral wool-forming apparatus, a receptacle for receiving the molten material, said receptacle comprising bottom, rear, and end walls, and a partial forward wall secured in assembled relationship, a layer of refractory material overlying said bottom wall, said end walls including extensions projecting beyond said partial forward wall and including upwardly extending arms defining member-receiving slots, and a forward wall member having a plurality of discharge orifices removably supported in said slots.

4. In a mineral wool-forming apparatus, a receptacle for receiving the molten material, said receptacle comprising bottom, rear, and end walls, and a partial forward wall secured in assembled relationship, a layer of refractory material overlying said bottom wall, said end walls including extensions projecting beyond said partial forward wall and defining member-receiving slots, a forward wall member removably supported in said slots, said member having a plurality of elongated discharge orifices with their lower edges elevated a substantial distance from the bottom of the receptacle, said discharge orifices having lips formed of a highly heat-resistant material, and a removable cover for said receptacle.

5. In a mineral wool apparatus, a melting furnace of the cupola type having a restricted discharge opening and a receptacle for the molten material immediately below said discharge opening in position to be subjected to the flame issuing therethrough, said receptacle including a forward wall having a plurality of vertically elongated discharge orifices therein, the lower ends of said discharge orifices being spaced substantially above the bottom of said receptacle and substantially below the upper edge thereof whereby molten material may flow from said furnace to form a deep pool within said receptacle.

FREDERICK C. FREEMAN.
ALFONS B. RIEGER.